US012738299B2

(12) United States Patent
Ishikawa

(10) Patent No.: US 12,738,299 B2
(45) Date of Patent: Sep. 15, 2026

(54) DATA PROCESSING APPARATUS AND DATA PROCESSING METHOD

(71) Applicant: SONY GROUP CORPORATION, Tokyo (JP)

(72) Inventor: Tsuyoshi Ishikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 3 days.

(21) Appl. No.: 18/707,208

(22) PCT Filed: Oct. 31, 2022

(86) PCT No.: PCT/JP2022/040595
§ 371 (c)(1),
(2) Date: May 3, 2024

(87) PCT Pub. No.: WO2023/085139
PCT Pub. Date: May 19, 2023

(65) Prior Publication Data
US 2024/0331735 A1 Oct. 3, 2024

(30) Foreign Application Priority Data
Nov. 12, 2021 (JP) ................................ 2021-184795

(51) Int. Cl.
*G11B 27/036* (2006.01)
*G11B 27/00* (2006.01)
(Continued)

(52) U.S. Cl.
CPC .......... *G11B 27/036* (2013.01); *G11B 27/005* (2013.01); *H04N 13/117* (2018.05); *H04N 13/139* (2018.05)

(58) Field of Classification Search
CPC .. G11B 27/036; G11B 27/005; H04N 13/117; H04N 13/139
See application file for complete search history.

(56) References Cited

U.S. PATENT DOCUMENTS

2008/0055305 A1* 3/2008 Blank ..................... G06T 15/08 345/419
2018/0061071 A1* 3/2018 Okutani ................ G06T 15/005
2023/0056923 A1* 2/2023 Hsieh ..................... G16H 15/00

FOREIGN PATENT DOCUMENTS

JP 2001169237 A * 6/2001
JP 2015187797 A * 10/2015
(Continued)

OTHER PUBLICATIONS

International Search Report and Written Opinion of PCT Application No. PCT/JP2022/040595, issued on Dec. 27, 2022, 09 pages of ISRWO.

*Primary Examiner* — Girumsew Wendmagegn
(74) *Attorney, Agent, or Firm* — CHIP LAW GROUP

(57) ABSTRACT

The present disclosure relates to a data processing apparatus, a data processing method, and a program that enable added value to be provided to viewing of volumetric content. An editing acceptance unit accepts editing of the volumetric image according to an operation of a user, and a data generation unit generates converted data in which an edited volumetric image is converted into a format that can be output by another device. The present disclosure can be applied to an application in which the volumetric content can be edited.

18 Claims, 18 Drawing Sheets

(51) Int. Cl.
*H04N 13/117* (2018.01)
*H04N 13/139* (2018.01)

(56) References Cited

FOREIGN PATENT DOCUMENTS

| | | | |
|---|---|---|---|
| JP | 2018-036956 | A | 3/2018 |
| JP | 2019-145017 | A | 8/2019 |
| KR | 10-2017-0019819 | A | 2/2017 |
| WO | 2020/129659 | A1 | 6/2020 |

* cited by examiner

100
CONTENT SERVER
110
CONTENT MANAGEMENT UNIT
120
CONTENT DISTRIBUTION UNIT
300
SNS SERVER
320
SNS PROCESSING UNIT
310
DATA RECEPTION UNIT
NW
VOLUMETRIC CONTENT
SNS-COMPATIBLE DATA
200
USER TERMINAL (EDITOR)
210
CONTENT RECEPTION UNIT
220
RENDERING UNIT
230
EDITING ACCEPTANCE UNIT
250
DATA TRANSMISSION UNIT
240
DATA GENERATION UNIT
260
ACCUMULATION CONTROL UNIT
10

P70-1
VIEWPOINT POSITION 1
ML
VIEWPOINT POSITION 3 (FOLLOWING TARGET)
VIEWPOINT POSITION 2
P70-2
SHOWING GOOD RESULTS OF PRACTICE. HOPING SUCCESS IN THIS SEASON!
P70-3

DATA PROCESSING APPARATUS AND DATA PROCESSING METHOD

CROSS REFERENCE TO RELATED APPLICATIONS

This application is a U.S. National Phase of International Patent Application No. PCT/JP2022/040595 filed on Oct. 31, 2022, which claims priority benefit of Japanese Patent Application No. JP 2021-184795 filed in the Japan Patent Office on Nov. 12, 2021. Each of the above-referenced applications is hereby incorporated herein by reference in its entirety.

TECHNICAL FIELD

The present disclosure relates to a data processing apparatus, a data processing method, and a program, and more particularly, to a data processing apparatus, a data processing method, and a program that provide added value to viewing of volumetric content.

BACKGROUND ART

There is known a free viewpoint video technology that enables video viewing from a virtual viewpoint where no camera is actually placed, on the basis of videos captured by a plurality of cameras. For example, Patent Document 1 discloses a technique for constructing and reproducing a replay video of a free viewpoint video with a low load.

In recent years, a range of use of volumetric video technology for converting the entire space into three-dimensional data has been expanded to various fields such as sports, music, and entertainment.

CITATION LIST

Patent Document

Patent Document 1: Japanese Patent Application Laid-Open No. 2019-145017

SUMMARY OF THE INVENTION

Problems to be Solved by the Invention

At present, in a case where the volumetric content provided by a volumetric video technology is viewed, a viewpoint or an opinion of a viewer cannot be reflected in the content.

The present technology has been made in view of such a situation, and an object thereof is to enable added value to be provided to the viewing of the volumetric content.

Solutions to Problems

The data processing apparatus according to the present disclosure is a data processing apparatus including: an editing acceptance unit that accepts editing of a volumetric image in response to an operation of a user; and a data generation unit that generates converted data in which the volumetric image has been edited is converted into a format that can be output by another device.

The data processing method according to the present disclosure is a data processing method performed by a data processing apparatus, the method including: accepting editing of a volumetric image in response to an operation of a user; and generating converted data in which the volumetric image that has been edited is converted into a format that can be output by another device.

A program according to the present disclosure is a program that causes a computer to execute processing of: accepting editing of a volumetric image in response to an operation of a user; and generating converted data in which the volumetric image that has been edited is converted into a format that can be output by another device.

In the present disclosure, the editing of the volumetric image is accepted according to the operation of the user, and the converted data is generated in which the volumetric image that has been edited is converted into a format that can be output by another device.

MODE FOR CARRYING OUT THE INVENTION

Hereinafter, a mode for carrying out the present disclosure (hereinafter referred to as an embodiment) will be described. Note that the description will be made in the following order.

1. Outline of content providing service
2. Configuration and operation of data processing system
3. Specific example of editing information
4. Configuration example of computer <1. Outline of Content Providing Service>

Figure 1:
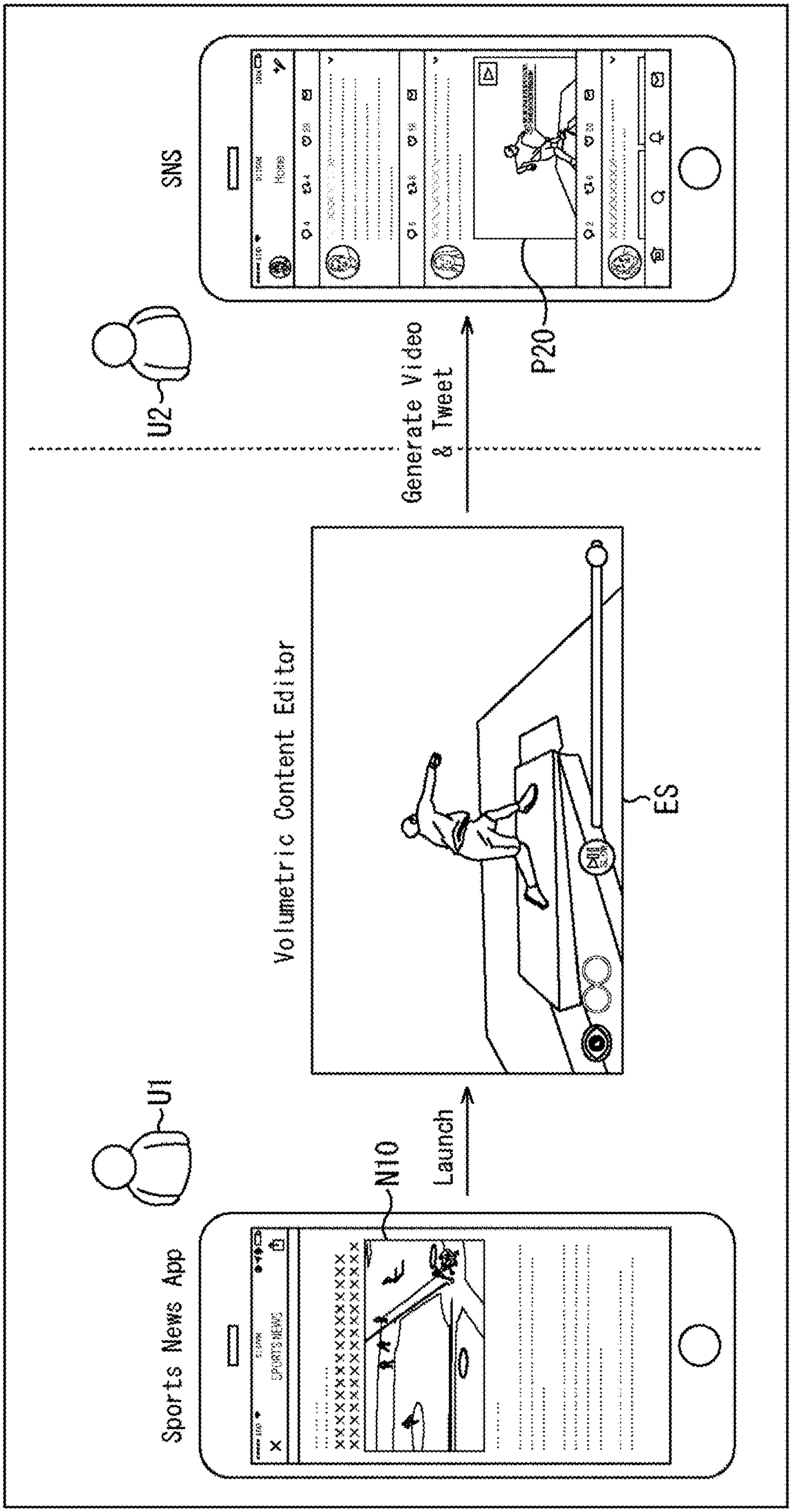
FIG. 1 is a diagram illustrating an outline of a content providing service to which a technique according to the present disclosure is applied.

FIG. 1 is a diagram illustrating an outline of a content providing service to which a technique according to the present disclosure is applied.

In the content providing service illustrated in FIG. 1, a user U1 can view the volumetric content from a desired angle (viewpoint), add a comment or the like to the content, and post the content on a social networking system (SNS). Meanwhile, a user U2 can easily view the content from a viewpoint unique to the user U1 via the SNS.

The user U1 is, for example, a core fan who is familiar with specific sports, music, and the like, and the user U2 is a general fan who is interested in those sports, music, and the like.

In the content providing service illustrated in FIG. 1, for example, the user U1 selects (clicks) an image N10 in news content browsable by a sports news application (app) installed in one's smartphone. Then, in the smartphone of the user U1, a volumetric editor (hereinafter, also simply referred to as an editor) for editing the volumetric content is started up.

In a case where the image N10 shows a scene of a sports game, when the image N10 is selected, volumetric content generated by capturing the sports game with a plurality of cameras is downloaded from a predetermined content server. The user U1 can edit the volumetric content downloaded from the content server by operating an edit screen displayed on the smartphone by starting up the editor. Specifically, the user U1 can designate a viewpoint position of the volumetric content, and add a comment to the volumetric content.

When the editing of the volumetric content is completed, the editor converts a format of the edited volumetric content into a file format that can be posted on the SNS, and transmits the obtained converted data (SNS-compatible data) to the SNS server.

The user U2 can browse a volumetric content P20 edited by the user U1 together with the text data input by the user U1 by accessing the SNS on one's smartphone.

As described above, in the content providing service to which the technology according to the present disclosure is applied, the user U1 can, for example, transmit a unique viewpoint and opinion for a certain sport, and the user U2 can deepen the understanding of the sport. That is, according to the technique of the present disclosure, an added value can be provided to the viewing of the volumetric content.

<2. Configuration and Operation of Data Processing System>

Hereinafter, a configuration and an operation of a data processing system that realizes the content providing service of FIG. 1 will be described.

(Overall Configuration of Data Processing System)

Figure 2:
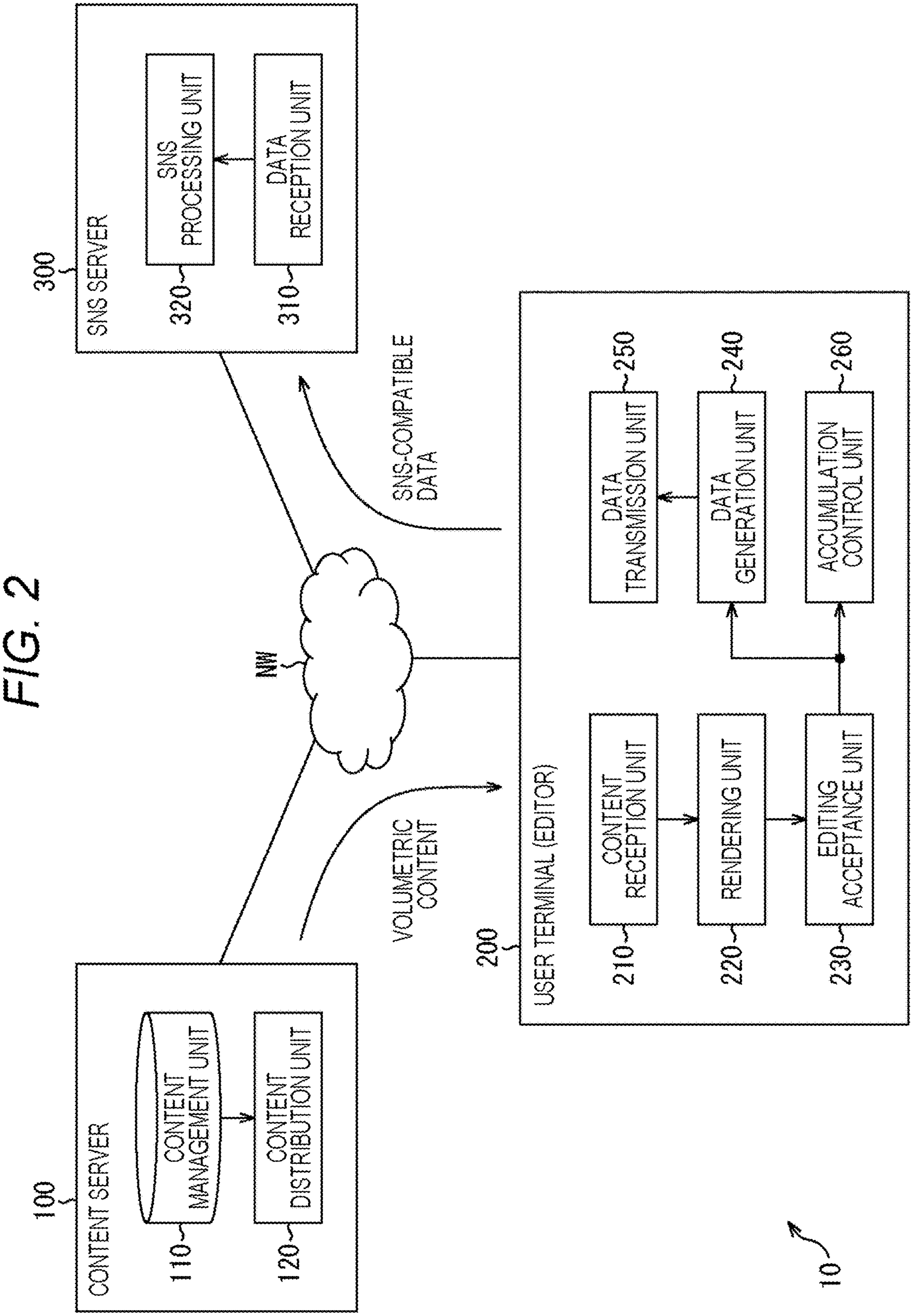
FIG. 2 is a diagram illustrating a configuration example of a data processing system according to an embodiment of the present disclosure.

FIG. 2 is a diagram illustrating a configuration example of a data processing system according to an embodiment of the present disclosure.

A data processing system 10 in FIG. 2 includes a content server 100, a user terminal 200, and an SNS server 300.

In the data processing system 10, the user terminal 200 is connected to the content server 100 and the SNS server 300 built on a so-called cloud via a network NW such as the Internet.

The content server 100 is configured as a distribution server that distributes the volumetric content to the user terminal 200. The content server 100 includes a content management unit 110 and a content distribution unit 120.

The content management unit 110 accumulates and manages the volumetric content that is free viewpoint video generated in various fields such as sports, music, and entertainment.

The content distribution unit 120 distributes the volumetric content managed by the content management unit 110 to the user terminal 200 in response to a request from the user terminal 200.

The user terminal 200 is configured as a portable terminal such as a smartphone by which the volumetric content can be viewed, and an editor for editing the volumetric content is installed therein. The user terminal 200 (editor) includes a content reception unit 210, a rendering unit 220, an editing acceptance unit 230, a data generation unit 240, a data transmission unit 250, and an accumulation control unit 260.

The content reception unit 210 requests the content server 100 for the volumetric content by using a predetermined operation of the user on the user terminal 200 as a start-up trigger. The content reception unit 210 receives the volumetric content distributed from the content server 100 in response to the request, and supplies the volumetric content to the rendering unit 220.

The rendering unit 220 renders the volumetric content from the content reception unit 210. Three-dimensional image data as the rendered volumetric content (hereinafter, referred to as a volumetric image) is supplied to the editing acceptance unit 230.

The editing acceptance unit 230 accepts editing of the volumetric image from the rendering unit 220 according to the operation of the user on the user terminal 200. The editing of the volumetric image includes designation of a viewpoint position of the volumetric content, addition of a comment on the volumetric content, and the like as described above. The edited volumetric image is supplied to the data generation unit 240 and the accumulation control unit 260.

The data generation unit 240 generates converted data obtained by converting the edited volumetric image from the editing acceptance unit 230 into a format that can be output by another device.

Specifically, the format of the converted data includes a moving image, a still image, a predetermined uniquely defined file format, and the like, and is a file format that can be posted on a predetermined SNS. That is, the converted data can also be said to be SNS-compatible data converted into an SNS compatible format. The SNS-compatible data generated by the data generation unit 240 is supplied to the data transmission unit 250.

The data transmission unit 250 transmits the SNS-compatible data from the data generation unit 240 to the SNS server 300 via the network NW according to the operation of the user on the user terminal 200.

The accumulation control unit 260 accumulates the edited volumetric image from the editing acceptance unit 230 in a not-illustrated storage area. The edited volumetric image accumulated in the storage area is viewed again or re-edited by the user of the user terminal 200.

The SNS server 300 is managed by an SNS operating company that provides the SNS, and is able to provide the SNS of the SNS operating company. The SNS may be any SNS as long as an SNS application provided by the SNS operating company is installed in portable terminals including the user terminal 200, and the users of the respective portable terminals can individually transmit and receive messages, images, and the like with each other. The SNS server 300 includes the data reception unit 310 and the SNS processing unit 320.

The data reception unit 310 receives posted data such as messages and images posted on the SNS from a mobile terminal connected to the network NW. The posted data acquired by the data reception unit 310 also includes the SNS-compatible data (format-converted volumetric image) from the user terminal 200.

The SNS processing unit 320 provides the SNS service to the mobile terminal connected to the network NW on the basis of the posted data received by the data reception unit 310.

For the users of the SNS service, a place where personal diaries and photographs are presented or a place where the users interact with other members via a bulletin board is provided on the network NW. Furthermore, a message exchange service, a chat service, or the like is also provided as a tool for communication between the users.

With the above configuration, the user of the user terminal 200 can post the volumetric image edited by the user oneself on the SNS.

Note that the user terminal 200 is not limited to a portable terminal such as a smartphone, and may include a display device including operation means, such as a virtual reality (VR) device of such as a head-mounted display (HMD) type or a goggle type worn on the body of the user, an augmented reality (AR) device, or a stationary PC.

(Function of editor) Here, the function of the editor installed in the user terminal 200 will be described with reference to FIGS. 3A and 3B.

Figure 3B:
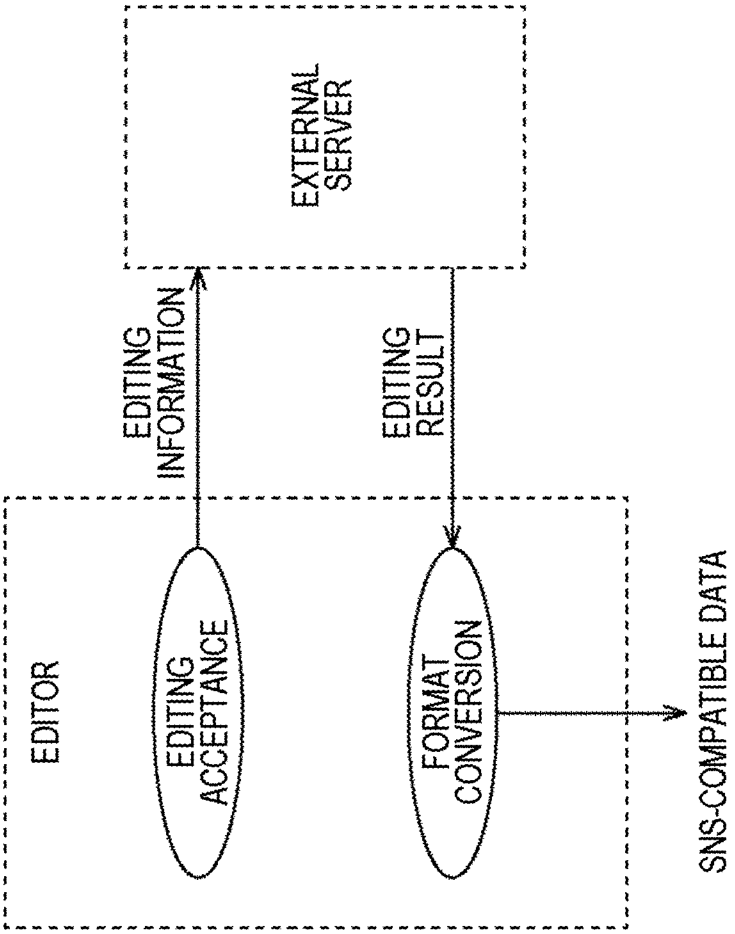
FIG. 3 is a diagram for describing functions of an editor.
Figure 3A:
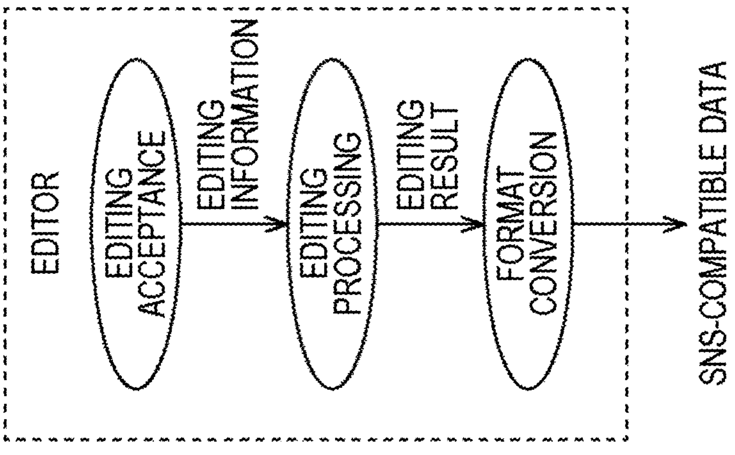

As illustrated in FIG. 3A, the editor accepts editing corresponding to an operation of the user on the user terminal 200 to generate editing information indicating the editing content to be reflected in the volumetric image.

The editor executes editing processing on the volumetric image on the basis of the generated editing information.

The editor converts the format of the edited volumetric image as an editing result to generate the SNS-compatible data.

The editing processing on the volumetric image may be executed not on the user terminal 200 in which the editor is installed but on an external server connected to the user terminal 200 via the network NW.

In this case, as illustrated in FIG. 3B, the editor transmits, to the external server, the editing information generated by accepting the editing corresponding to the operation of the user on the user terminal 200.

The external server executes the editing processing on the volumetric image on the basis of the editing information from the editor, and transmits the edited volumetric image as an editing result to the editor.

The editor converts the format of the editing result (the edited volumetric image) from the external server to generate the SNS-compatible data.

According to the configuration in the drawing B, because the editing processing on the volumetric image is no longer required to be executed on the user terminal 200, the processing load of the user terminal 200 can be reduced.

(Operation of Editor)

Figure 4:
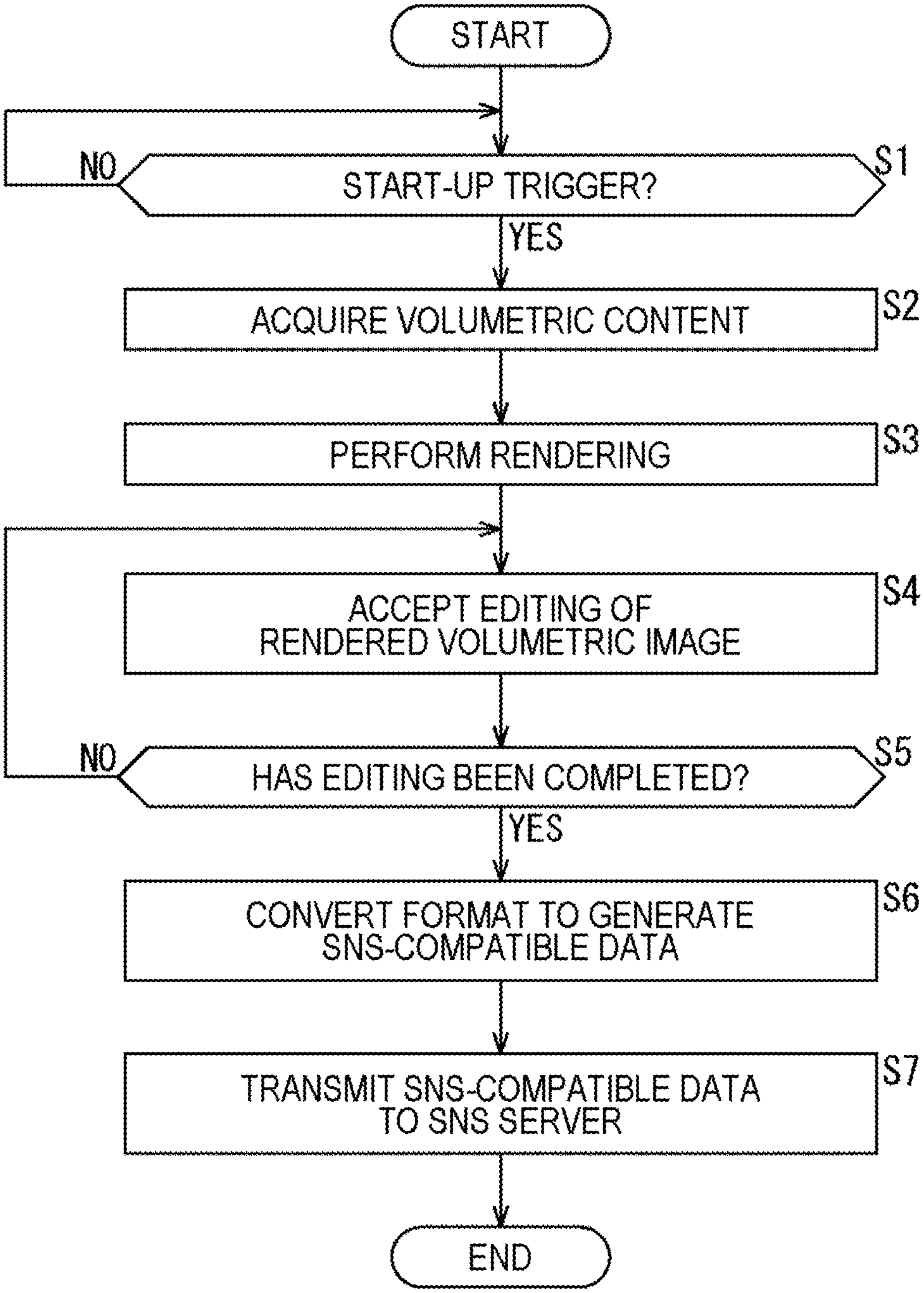
FIG. 4 is a flowchart for explaining a flow of an operation of the editor.

Next, the flow of the operation of the editor in the user terminal 200 will be described with reference to a flowchart in FIG. 4. The processing in FIG. 4 is started in a state in which, for example, a sports news application (dedicated application) or a web browser installed in the user terminal 200 as described with reference to FIG. 1, by which news content as a website can be browsed, is started up.

In step S1, the user terminal 200 determines whether or not the editor start-up trigger has occurred. The start-up trigger of the editor is, for example, an operation on the content browsed by the user, and in the example in FIG. 1, is a click of the image N10 in the news content browsed using the sports news application, or the like.

That is, the editor includes a native application installed in the user terminal 200, and is started up on the basis of designation information embedded in the content (in the example of FIG. 1, the news content) browsed by the user.

For example, in a case where the news content browsed by the user is written in hypertext markup language (HTML), a tag such as <a href="editor"><img src="file name of image N10"></a> is written. In this case, the editor can be started up by clicking the image N10 in the news content.

Furthermore, the designation information also includes link information to the volumetric content managed by the content server 100.

Now, step S1 is repeated until the start-up trigger occurs, and when the start-up trigger occurs, the process proceeds to step S2.

In step S2, the content reception unit 210 requests the content server 100 for volumetric content corresponding to the start-up trigger to acquire the volumetric content.

In step S3, the rendering unit 220 renders the volumetric content acquired from the content server 100.

In step S4, the editing acceptance unit 230 accepts editing of the rendered volumetric image according to the operation of the user on the user terminal 200. The editing of the volumetric image is accepted on an edit screen displayed on the user terminal 200 in response to the start up of the editor.

Figure 5:
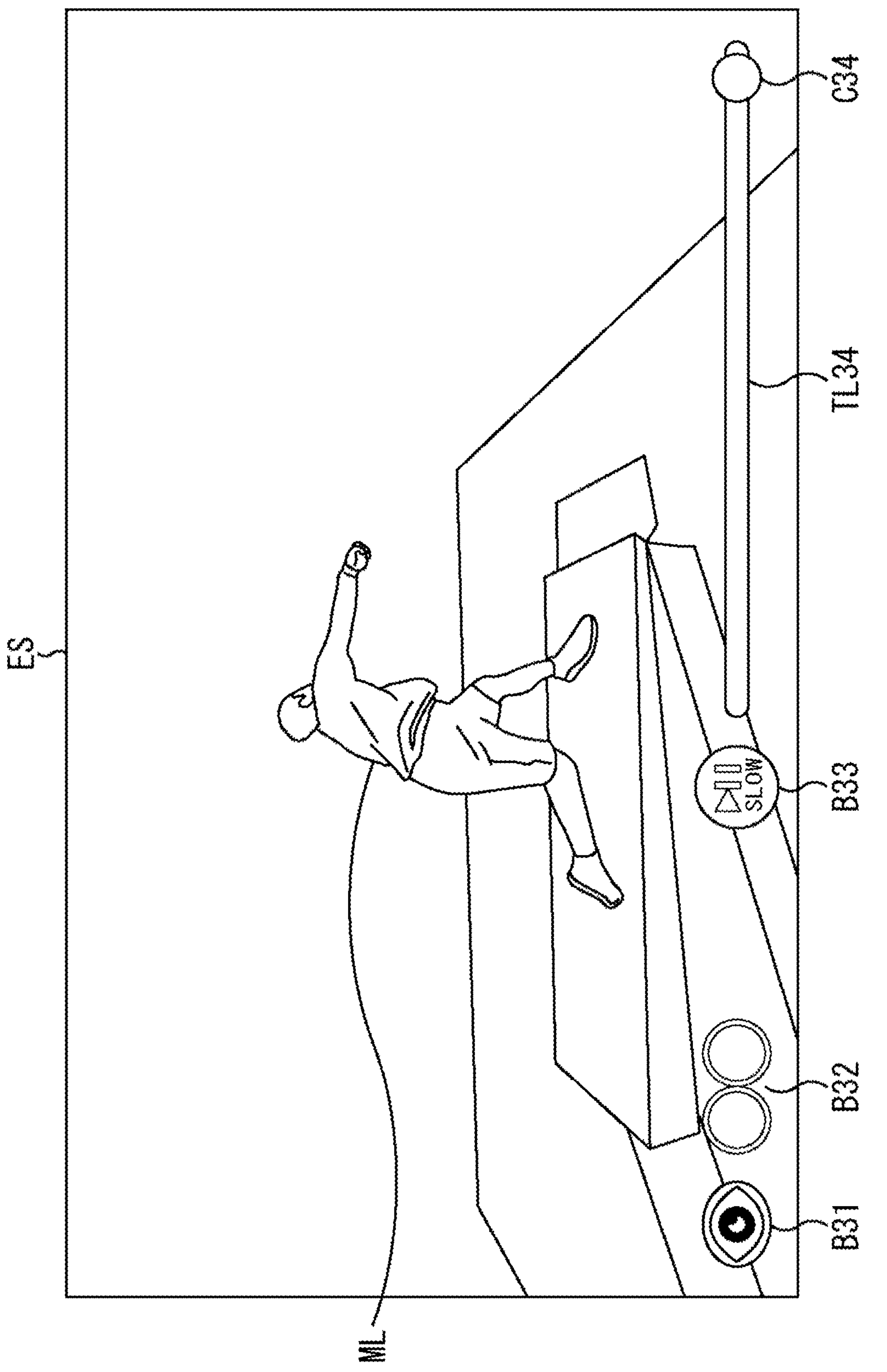
FIG. 5 is a diagram illustrating an example of an edit screen.

FIG. 5 is a diagram illustrating an example of the edit screen.

On an edit screen ES in FIG. 5, a volumetric image with a model ML as a main subject (observation target) is displayed. In the example in FIG. 5, the model ML is a baseball pitcher, and the user can view how the model ML pitches in the volumetric image from various viewpoint positions.

Furthermore, a graphical user interface (GUI) for editing the volumetric image is displayed on the edit screen ES in FIG. 5. In the example in FIG. 5, buttons B31, B32, and B33 and a timeline TL34 are displayed on the edit screen ES. These GUIs are displayed so as to be superimposed on the volumetric image on the edit screen ES, but may be displayed in a region distinguished from a display region of the volumetric image. The button B31 is a GUI for changing the viewpoint position of the volumetric image to a recommended viewpoint position designated in advance.

The button B32 is a GUI for changing the viewpoint position of the volumetric image to positions of balloons arranged in a three-dimensional space reproduced by the volumetric image. Although details will be described later, when the button B32 is operated, these balloons are displayed so as to be arranged, for example, on a cubic lattice in the three-dimensional space reproduced by the volumetric image.

The button B33 is a GUI for adjusting the reproduction speed of the volumetric image. For example, every time the button B33 is operated, the reproduction speed of the volumetric image changes stepwise.

The timeline TL34 is a GUI for indicating a current temporal position in the total reproduction time of the volumetric image. In the timeline TL34, a cursor C34 indicating the current temporal position is displayed so as to move on the timeline TL34 with the lapse of time.

By operating these GUIs on the edit screen ES, the user can designate the viewpoint position of the volumetric image and add a comment to the volumetric image. The addition of the comment to the volumetric image is performed, for example, by inputting a text by a predetermined text editor or converting an utterance content into a text with respect to a position designated by the user on the volumetric image whose reproduction is paused.

Returning to the flowchart in FIG. 4, in step S5, the editing acceptance unit 230 determines whether or not the editing of the volumetric image is completed. The completion of the editing of the volumetric image is determined by, for example, whether or not a not-illustrated edit completion button is operated.

Steps S4 and S5 are repeated until it is determined that the editing of the volumetric image is completed, and when it is determined that the editing of the volumetric image is completed, the process proceeds to step S6.

In step S6, the data generation unit 240 converts the format of the edited volumetric image to generate the SNS-compatible data.

Then, in step S7, the data transmission unit 250 transmits the generated SNS-compatible data to the SNS server 300.

As described above, the user of the user terminal 200 can post the volumetric image edited by the user oneself on the SNS.

Figure 6:
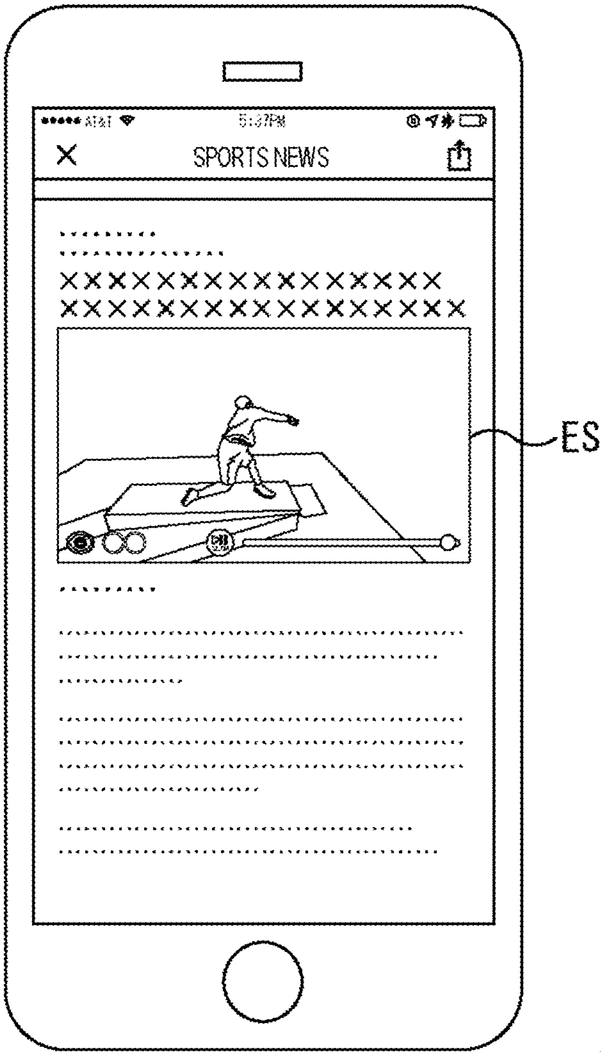
Fig. 6 is a diagram illustrating an example of an editor as a web application.

Fig. 6 is a diagram illustrating an example of the format of the SNS-compatible data to be posted on the SNS.

Figure 7:
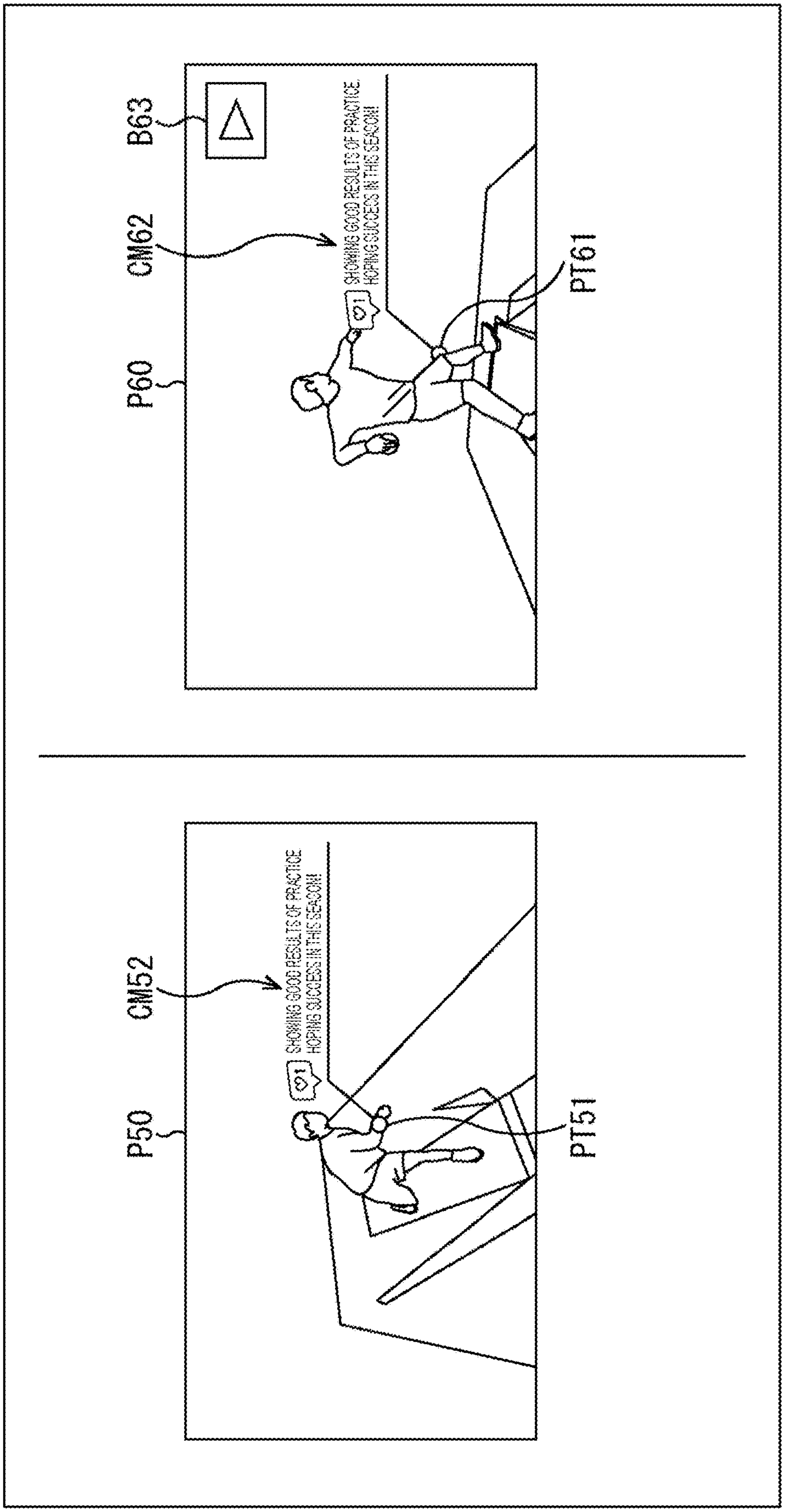
Fig. 7 is a diagram illustrating an example of a format of SNS-compatible data.

SNS-compatible data P50 illustrated on the left side in Fig. 7 is a still image. The SNS-compatible data P50 is a still image at the time and a viewpoint position designated in the volumetric image, and is a still image in which a pointer PT51 and a comment CM52 are added to a position designated by the user. In this example, the pointer PT51 is added to a position corresponding to the hand of a model in the volumetric image, and the comment CM52 for the hand of the model is added.

The SNS-compatible data P60 illustrated on the right side in Fig. 7 is a moving image. The SNS-compatible data P60 is a moving image at a time section designated in the volumetric image and at a viewpoint position designated during the time section, and is a moving image in which a pointer PT61 and a comment CM62 are added to a position designated by the user. In this example, the pointer PT61 is added to a position corresponding to the leg (knee) of the model in the volumetric image, and the comment CM62 for the knee of the model is added. Furthermore, a reproduction button B63 for reproducing the moving image is superimposed on the SNS-compatible data P60.

Note that a predetermined effect image may be combined with the SNS-compatible data P50 and the SNS-compatible data P60 illustrated in Fig. 7 in addition to the pointer and the comment.

Furthermore, as described above, the format of the SNS-compatible data may be a predetermined file format uniquely defined. The SNS-compatible data in such a file format is displayed or reproduced by using a dedicated application. Even in such SNS-compatible data, a time and a viewpoint position can be designated in the volumetric image, or a pointer, a comment, or an effect image can be added to a position designated by the user.

According to the above processing, for example, the user of the user terminal 200 can transmit one's unique viewpoint or opinion for a certain sport through the SNS, and users of the SNS can deepen the understanding of the sport. That is, according to the technique of the present disclosure, the added value can be provided to the viewing of the volumetric content.

Note that, in the above description, the editor includes the native application installed in the user terminal 200, and is started up on the user terminal 200 on the basis of the designation information embedded in the content.

In addition, as illustrated in Fig. 6, the editor may include a web application and operate in a state of being embedded in the content. In the example in Fig. 6, for example, an editor is embedded in-line in news content browsable by a sports news application installed in the user terminal 200, and an edit screen ES is displayed on the news content.

Figure 8:
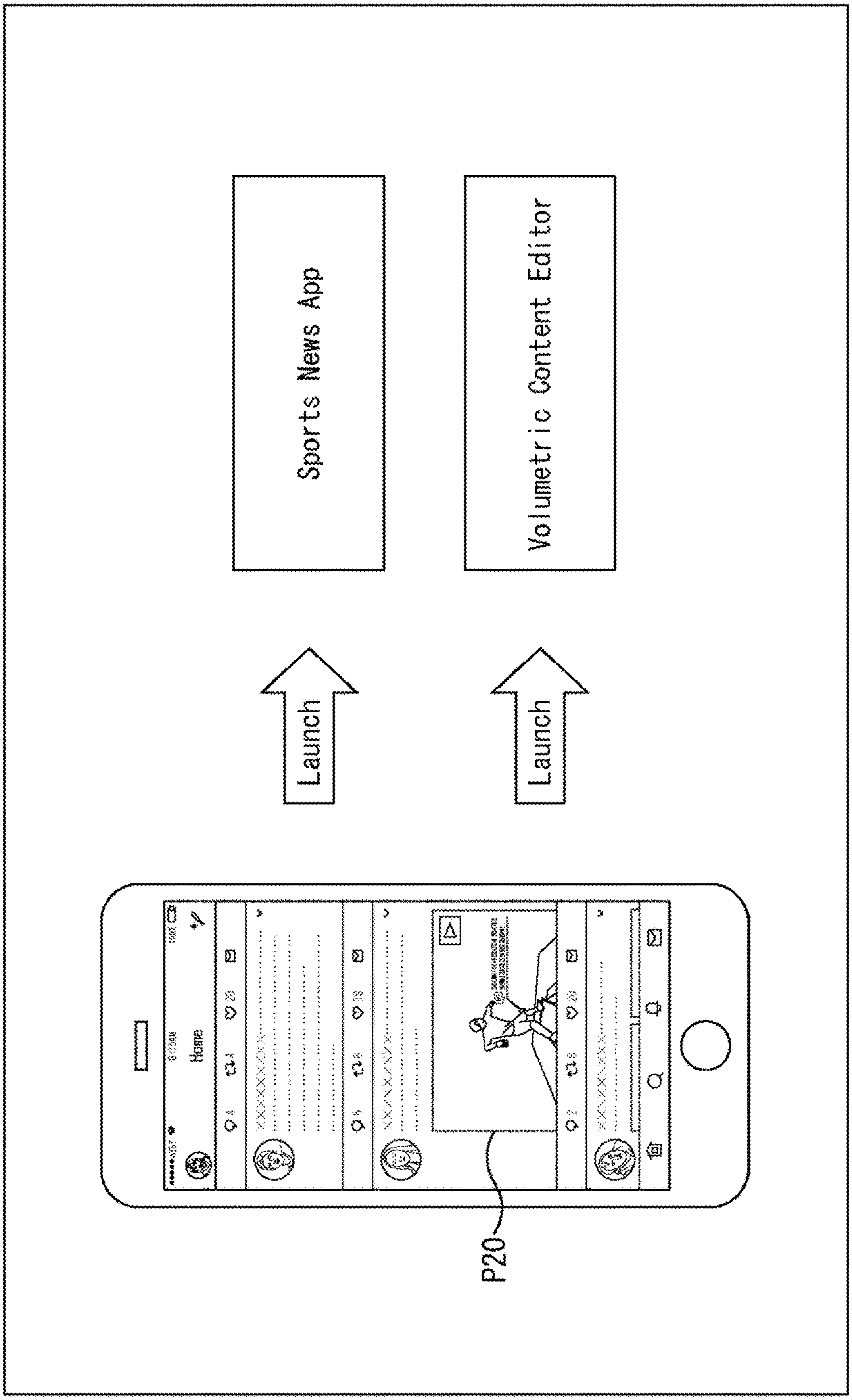
FIG. 8 is a diagram for describing a utilization example of the SNS-compatible data.

Furthermore, as illustrated in FIG. 8, when the volumetric content P20 posted on the SNS is selected (clicked) by a general fan who browses the SNS, a sports news application which is an editor start-up trigger may be started up or the editor may be started up in the user terminal 200. In this case, it is assumed that the sports news application or the editor is also installed in a mobile terminal of the user who is the general fan.

<3. Specific Example of Editing Information>

As described above, the editor generates the editing information indicating the editing content to be reflected in the volumetric image, and executes the editing processing on the volumetric image on the basis of the editing information. Hereinafter, a specific example of the editing information will be described.

(Viewpoint Information)

The editing information may include viewpoint information for designating one or more viewpoint positions in the volumetric image.

The viewpoint information is generated in such a manner that the user designates a viewpoint position (a direction and an angle of a viewpoint) desired to be recommended to other users with respect to a volumetric image which is a free viewpoint video.

Figure 9:
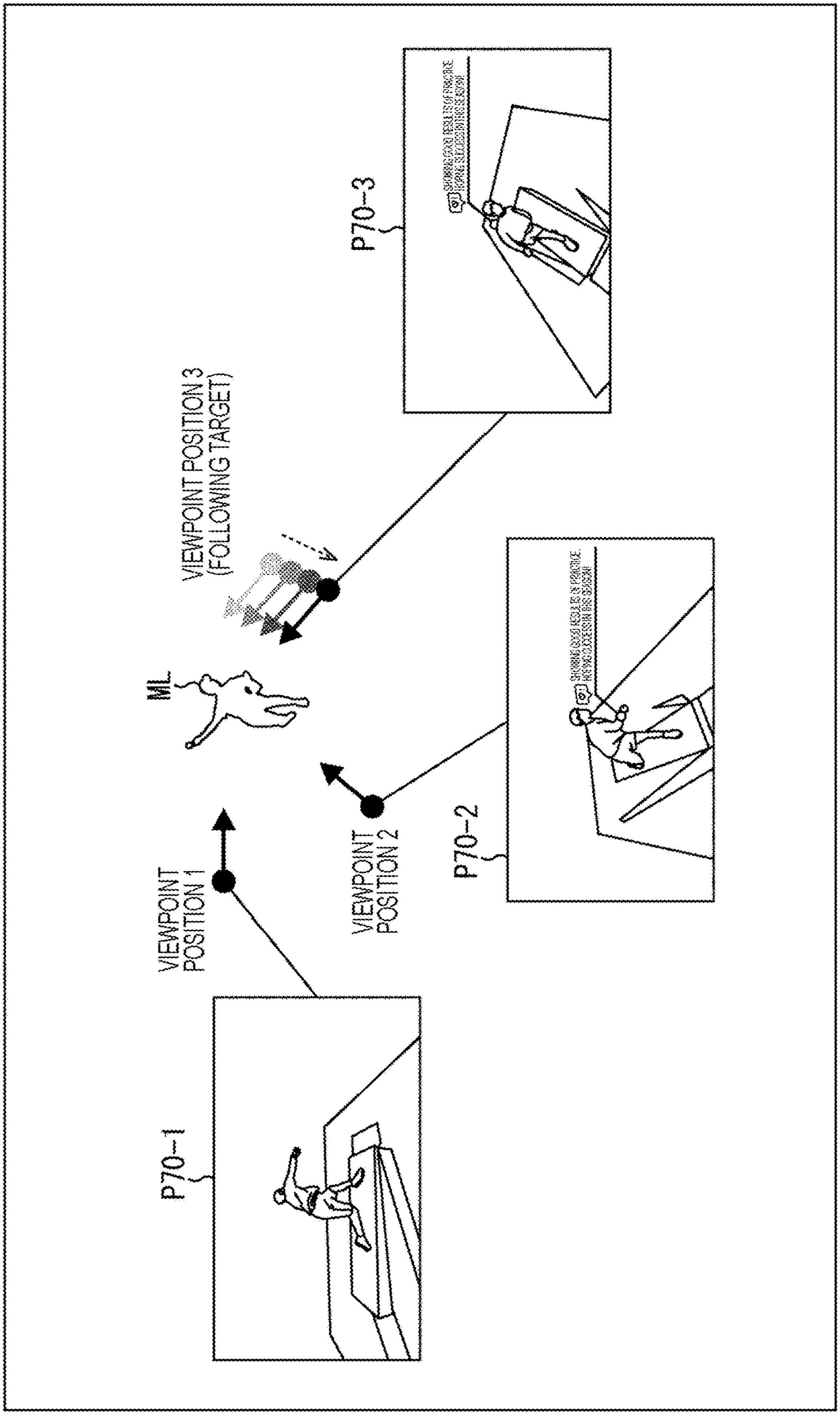
FIG. 9 is a diagram illustrating an example of viewpoint positions.

FIG. 9 is a diagram illustrating an example of the viewpoint positions.

FIG. 9 illustrates an example of the viewpoint positions facing a model ML who is a main subject (observation target) in the volumetric image.

A viewpoint position 1 is a viewpoint position facing the model ML from the right side of the model ML. By designating the viewpoint position 1, the SNS-compatible data P70-1 is generated, which is a still image or a moving image in which the model ML is captured within the angle of view from the right side.

A viewpoint position 2 is a viewpoint position facing the model ML from the right front of the model ML. By designating the viewpoint position 2, the SNS-compatible data P70-2 is generated, which is a still image or a moving image in which the model ML is captured within the angle of view from the right front.

A viewpoint position 3 is a viewpoint position following the movement of the model ML, and can be designated in a case where the position of the model ML or the portion thereof in the volumetric image can be tracked. By designating the viewpoint position 3, the SNS-compatible data P70-3 is generated, which is a moving image in which the model ML is captured within the angle of view while the moving model ML is followed.

The viewpoint positions such as the viewpoint position 1 and the viewpoint position 2 can be designated or changed by the operation of the user on the user terminal 200 or the edit screen ES.

Figure 10B:
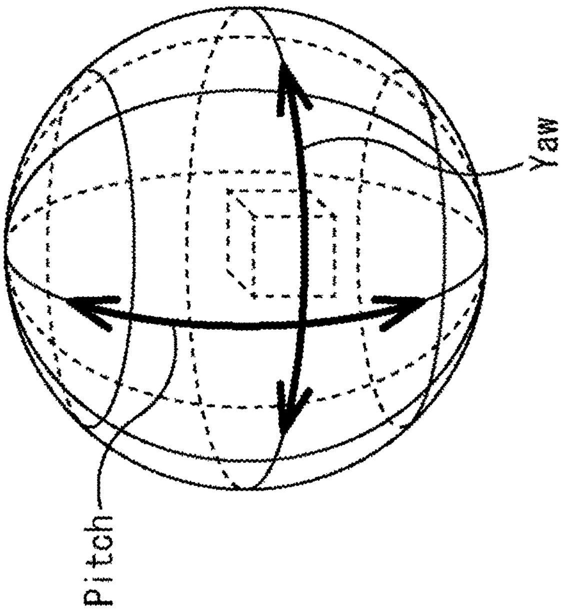
FIG. 10 is a diagram illustrating an example of means for designating the viewpoint positions.
Figure 10A:
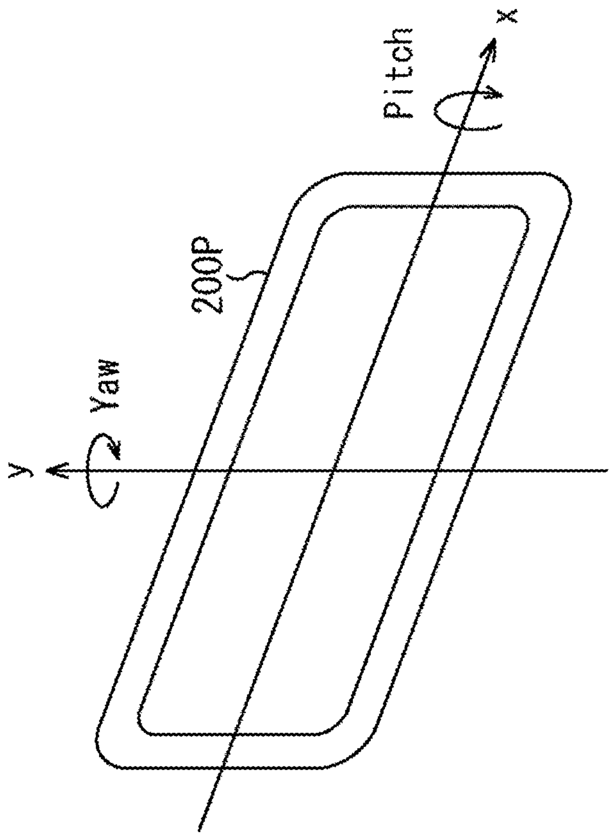

For example, as illustrated in Fig. 10A, it is assumed that an xy plane is defined on a screen of the user terminal 200. In this case, a position of a virtual camera (viewpoint position) in the volumetric image is rotationally moved in accordance with an inclination of the user terminal 200 due to the rotation (pitch) about the x axis and the rotation (yaw) about the y axis, as illustrated in FIG. 10B. Moreover, the position of the virtual camera (viewpoint position) in the volumetric image may be translated according to a touch operation such as swiping or pinch- in/pinch-out on the screen of the user terminal 200.

Figure 11:
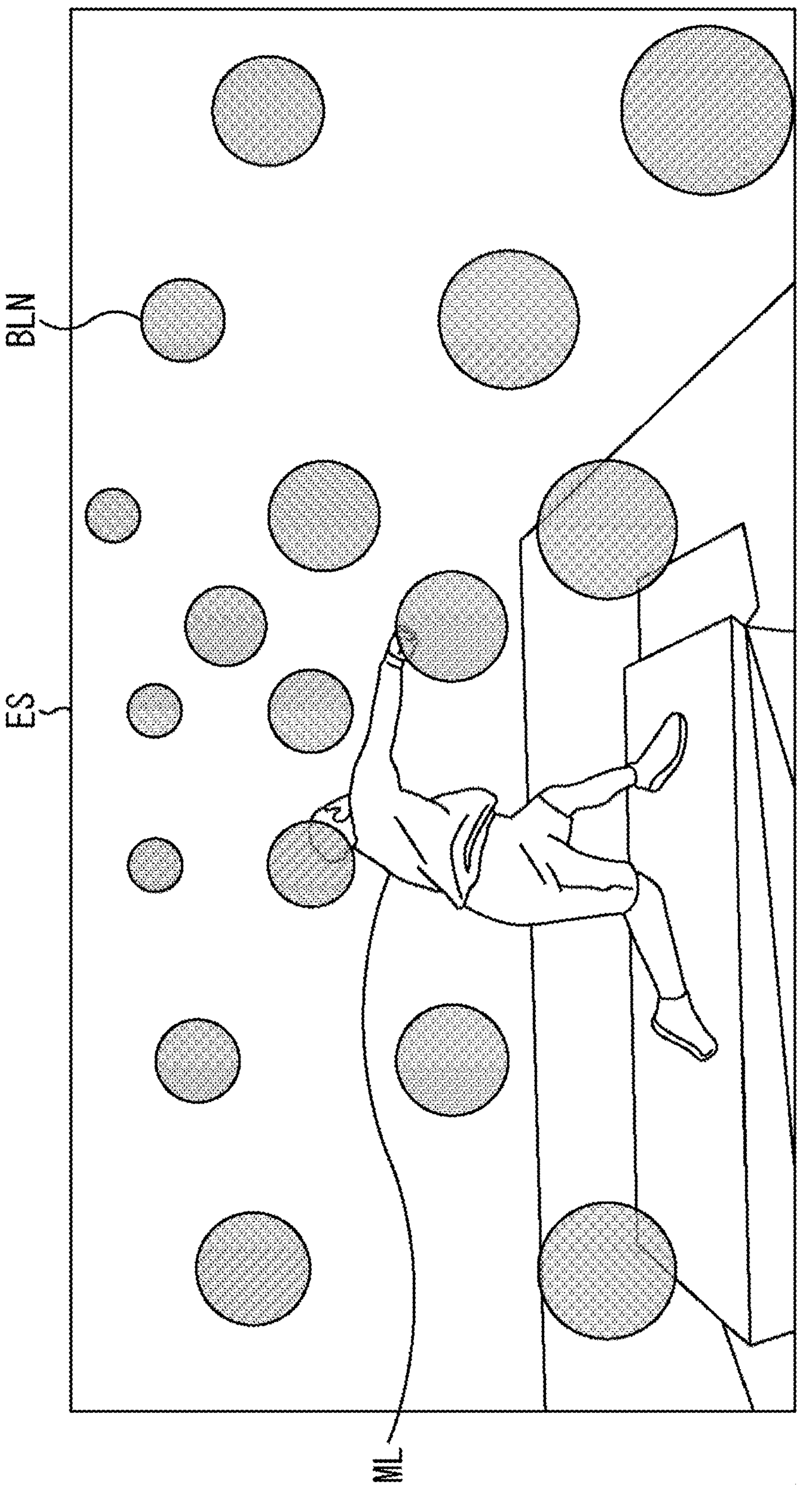
FIG. 11 is a diagram illustrating an example of means for designating the viewpoint positions.

Furthermore, by operating the button B32 of the edit screen ES described above, as illustrated in FIG. 11, balloons BLN are arranged in the three-dimensional space reproduced by the volumetric image. The balloons BLN are evenly arranged around, for example, the model ML being an observation target. In this case, the position of the virtual camera (viewpoint position) in the volumetric image is moved to the position of the balloon BLN touched by the user. At this time, regardless of the position of the touched balloon BLN, the direction of the viewpoint is the direction toward the model ML.

As described above, the user can designate the viewpoint position with respect to the volumetric image.

Note that correspondence information that correlates an attribute of the user with the viewpoint information may be added to the volumetric image (original volumetric content) as meta information. In this case, the viewpoint position is designated or recommended according to the attribute of the user who edits the volumetric image.

(Reproduction Information)

The editing information can include reproduction information designating at least one of a reproduction section and a reproduction speed in the volumetric image.

The reproduction information is generated in such a manner that the user performs designation on the volumetric image (original volumetric content) to designate a reproduction section in which the user wants to post or designate a reproduction speed (slow reproduction, high speed reproduction, etc.) in the designated reproduction section.

Figure 12:
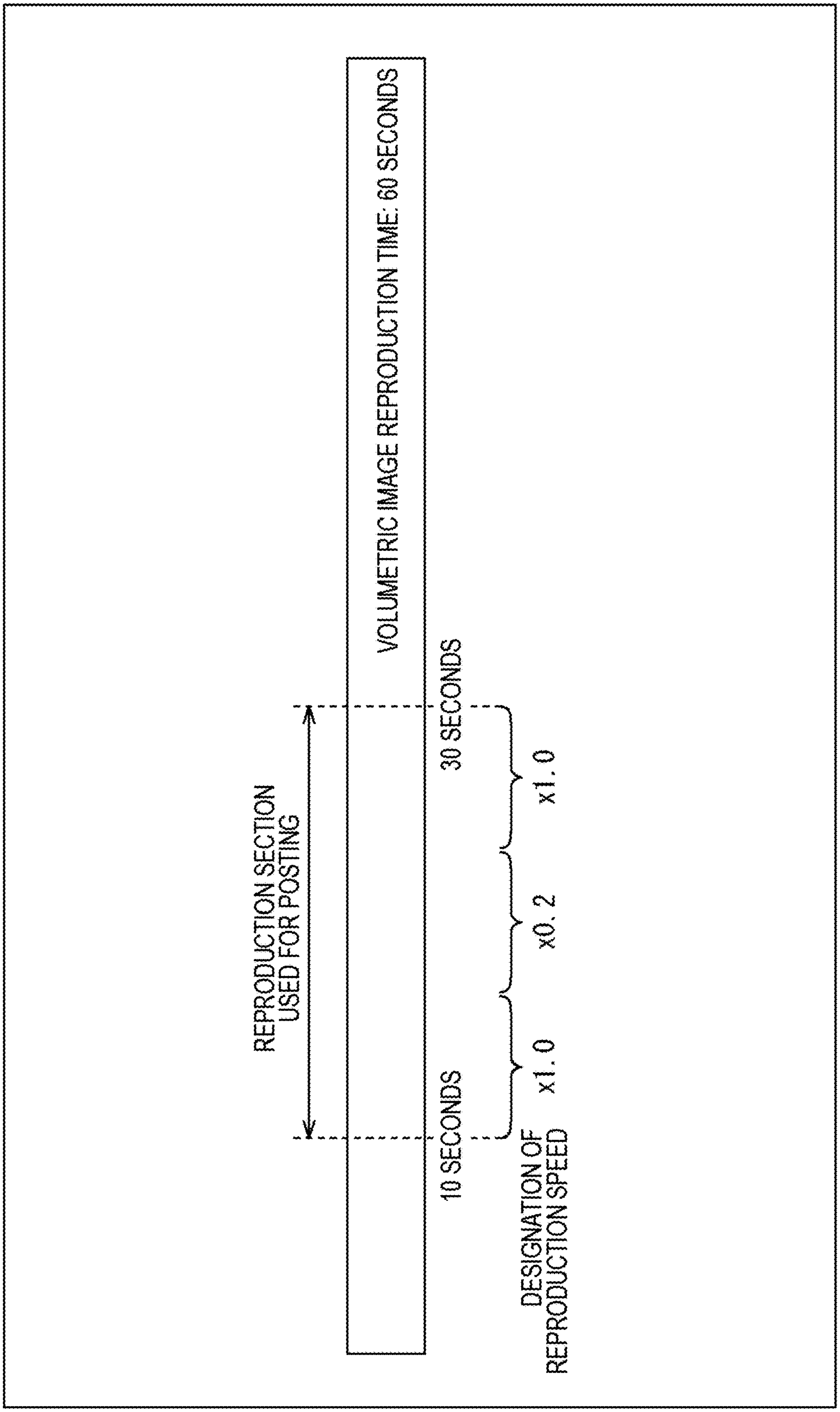
FIG. 12 is a diagram for explaining designation of a reproduction section and a reproduction speed.

FIG. 12 is a diagram for explaining designation of the reproduction section and the reproduction speed.

In the example in FIG. 12, for a volumetric image (original volumetric content) having a total reproduction time of 60 seconds, a duration of 20 seconds, which starts from 10 seconds to 30 seconds from the start of reproduction, are designated as a reproduction section used for SNS posting. Furthermore, within the designated reproduction section, reproduction speeds in the first third and the last third of the section are designated as normal reproduction (×1.0 times), and a reproduction speed of the middle third of the section is designated as slow reproduction (×0.2 times).

As described above, the user can designate the reproduction section and the reproduction speed for the volumetric image.

(Additional Information)

The editing information may include additional information added to an object in the volumetric image.

The additional information is generated when the user designates a time in the volumetric image (original volumetric content) or designates a region in the object at the designated time.

The additional information may be any information that the user wants to add as a comment to the volumetric image, such as a text, a still image, a moving image, or voice. Furthermore, the object to be an addition target of the additional information may be, for example, a moving object such as a person to be an observation target in the volumetric image, or may be a still object present around the observation target.

Figure 13:
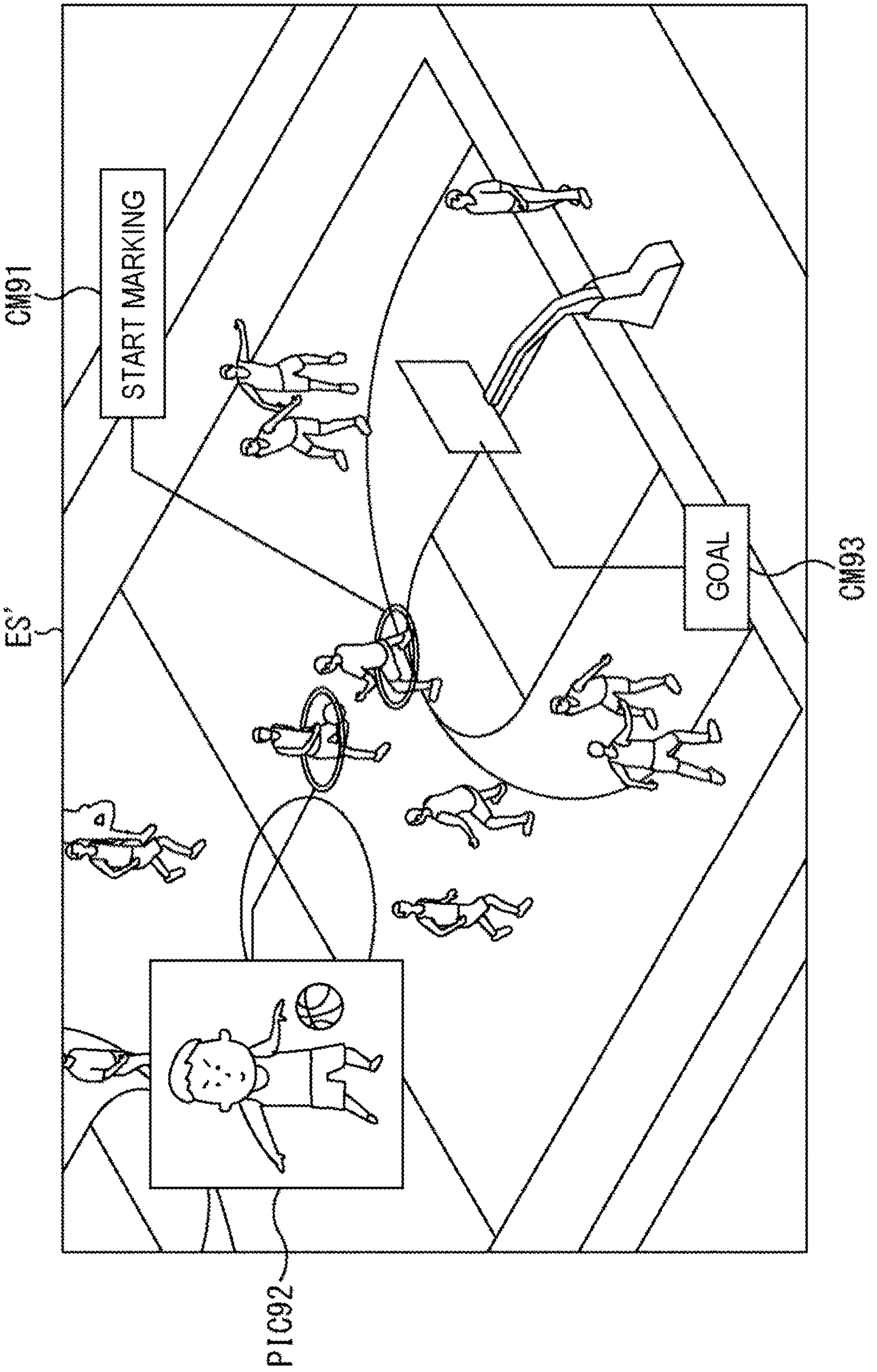
FIG. 13 is a diagram illustrating an example of additional information.

FIG. 13 is a diagram illustrating an example of the additional information.

On an edit screen ES' in FIG. 13, a volumetric image obtained by capturing a scene of a basketball game is displayed. It is assumed that a volumetric image at a time designated by the user is displayed on the edit screen ES'.

In the example in FIG. 13, a comment CM91 as additional information is added to one player (person) on the basketball court, and a still image PIC92 as additional information is added to another player (person). Furthermore, a comment CM93 as additional information is added to the goal placed on the basketball court. In this example, the comment CM91 and the still image PIC92 are additional information added to the moving object, and the comment CM93 is additional information added to the still object.

Furthermore, in addition to being added to the entire object such as a moving object or a still object, the additional information can be added to a region (specific part) designated in an object such as a moving object or a still object. However, in a case where the moving object to be an addition target is moving, the additional information is difficult to be added to the specific part of the moving object.

In this case, by designating a time in the volumetric image and then designating a region (specific part) in the moving object at that time, the additional information can be added to the specific part of the moving object. With this arrangement, similarly to the SNS-compatible data P50 and the SNS-compatible data P60 described with reference to Fig. 7, the additional information such as a comment can be added to the hand or the knee of a model that is a moving object.

Moreover, in a case where the position of the moving object such as a model or a specific part thereof in the volumetric image can be tracked, the additional information may be added so as to follow the position.

Figure 14:
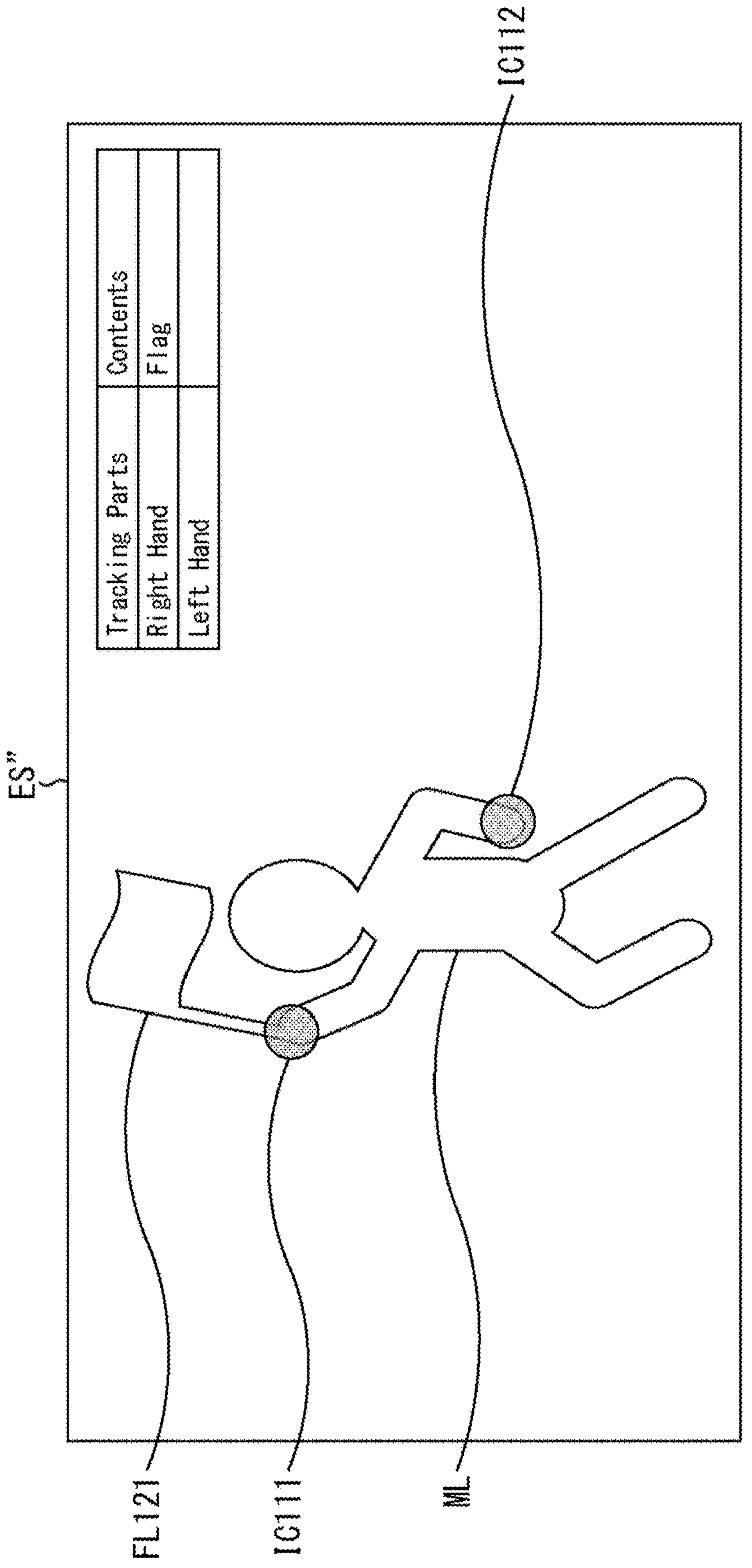
FIG. 14 is a diagram illustrating an example of additional information.

FIG. 14 is a diagram illustrating another example of the additional information.

On an edit screen ES" in FIG. 14, a volumetric image with a model ML who is dancing as a main subject (observation target) is displayed. In the edit screen ES", it is assumed that the left and right hands of the model ML are tracked, and spherical icon images IC111 and IC112 indicating that the left and right hands are tracked are displayed following the positions of the left and right hands of the model ML.

Moreover, in the example in FIG. 14, when the user selects the right hand (the icon image IC111) of the model ML to be an addition target of the additional information, a flag image FL121 is added as the additional information for following the position of the right hand.

Furthermore, part information indicating a specific part (a region to which additional information can be added) of a moving object such as a trackable model may be added to the volumetric image (original volumetric content) as meta information. In this case, as illustrated in the upper right of the edit screen ES" in FIG. 14, a list of part information is displayed, and by inputting input information indicating desired additional information to the corresponding part, the additional information can be provided so as to follow the position of the part desired to be the addition target.

(Effect Image)

The editing information may include an effect image combined with the volumetric image.

The effect image is generated for the purpose of more effectively and intuitively expressing the content of the additional information such as the comment described above.

Figure 15:
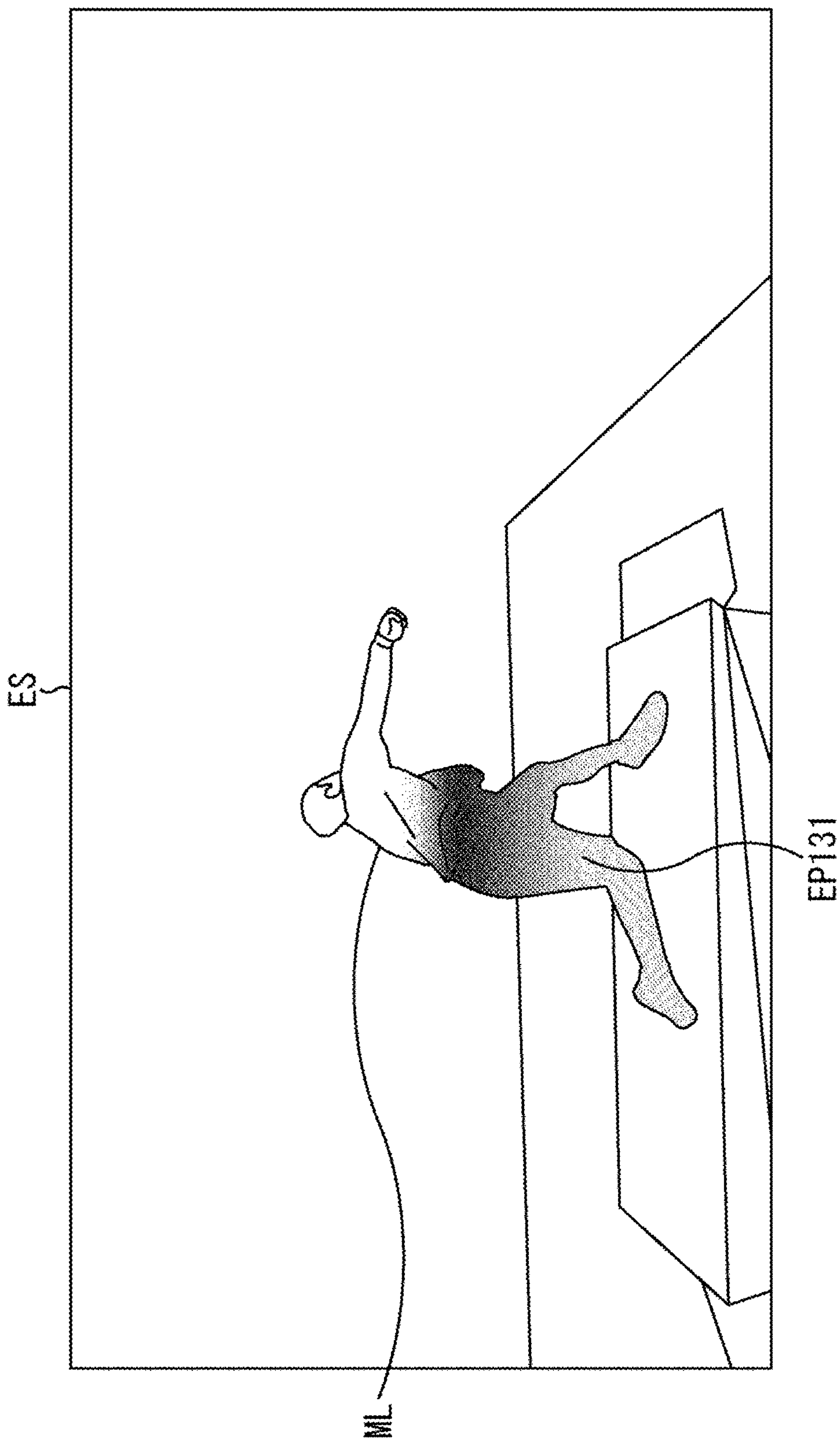
FIG. 15 is a diagram illustrating an example of an effect image.

For example, in the volumetric image displayed on the edit screen ES in FIG. 15, an effect image EP131 corresponding to the shape of the model ML is superimposed on the volumetric image. In the example in FIG. 15, the effect image EP131 is the effect image of a flame, and can be used in a case where the feeling of a baseball player who is the model ML is enhanced.

Figure 16:
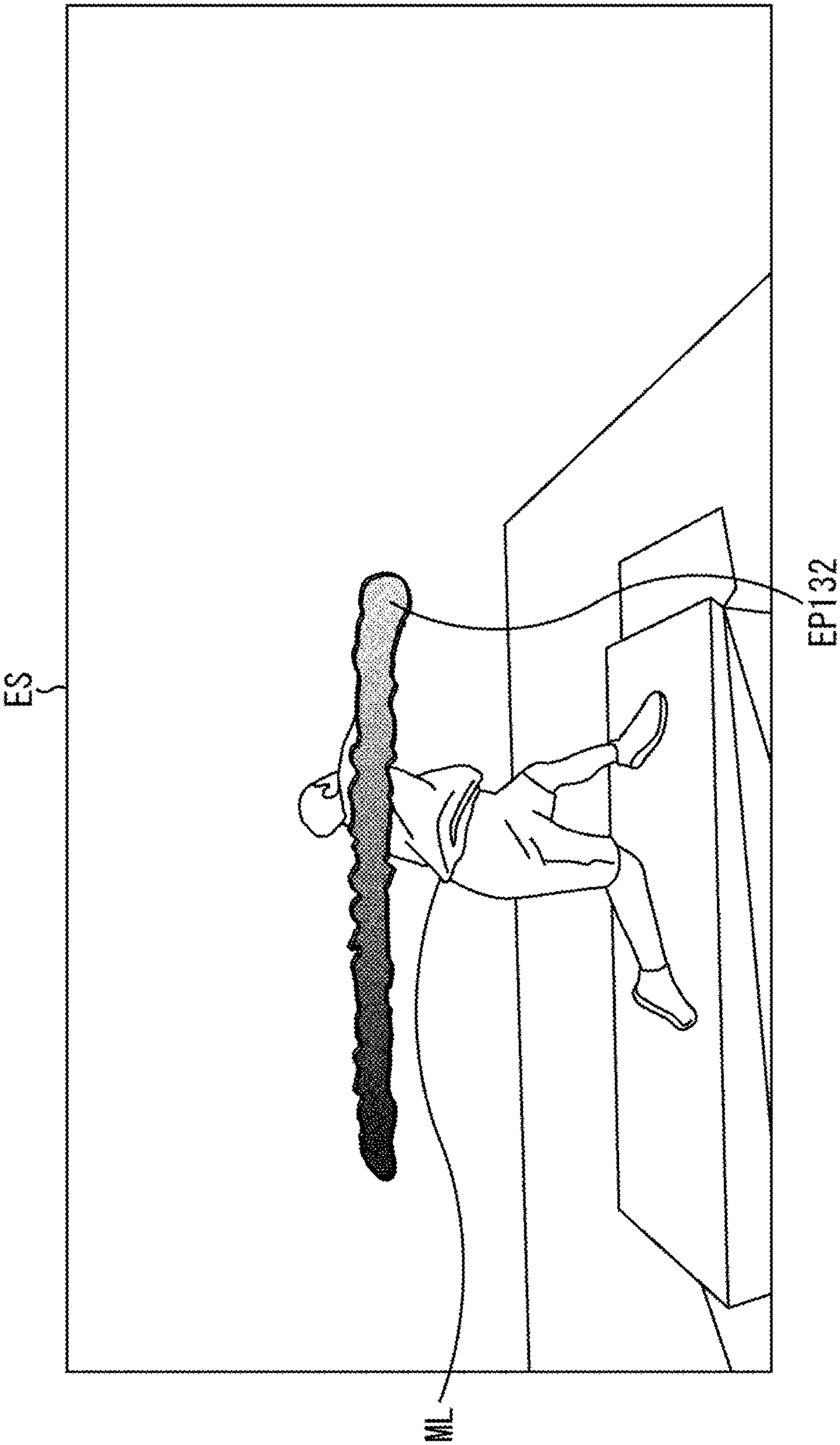
FIG. 16 is a diagram illustrating an example of an effect image.

Furthermore, in the volumetric image displayed on the edit screen ES in FIG. 16, an effect image EP132 corresponding to a specific position at a specific time that is designated is superimposed on the volumetric image. In the example in FIG. 16, the effect image EP132 is an effect image of a flame drawing an arc following the movement of the hand of the model ML, and can be used in a case where a pitch form of a baseball player who is the model ML is presented to appear dynamic.

Note that, as the effect image, an effect image other than the flame, a virtual self image representing a virtual self of the model ML, or the like may be prepared.

The editing information described above may be prepared as a data set corresponding to an attribute of a user (general fan) of the SNS as a viewer of the SNS-compatible data posted on the SNS. In this case, the editing content reflected in the volumetric image is switched according to a general fan that the user of the user terminal 200 wants to send one's viewpoint or opinion. With this arrangement, the user of the user terminal 200 can more accurately transmit one's viewpoint and opinion through the SNS.

(Restriction on Editing Content)

The specific example of the editing information indicating the editing content to be reflected in the volumetric image has been described above. However, there may be a case where restriction needs to be set to the editing content depending on the volumetric image (the volumetric content).

Therefore, a range of editing content to be reflected in the volumetric image may be restricted on the basis of restriction information for restricting the range of editing content indicated by the various types of editing information as described above. In this case, as the editing information, editing information of a range of editing content restricted on the basis of the restriction information is generated. For example, the restriction information is included in the meta information of the volumetric content by a provider of the volumetric image (original volumetric content).

Viewpoint Position

As a viewpoint position to be designated, there is a case where it is desired to restrict a viewpoint position extremely close to a person to be an observation target or a viewpoint position where the person is looked up from an extremely low level. In this case, the viewpoint position that can be designated by the user may be restricted by the restriction information.

Reproduction Section

Figure 17:
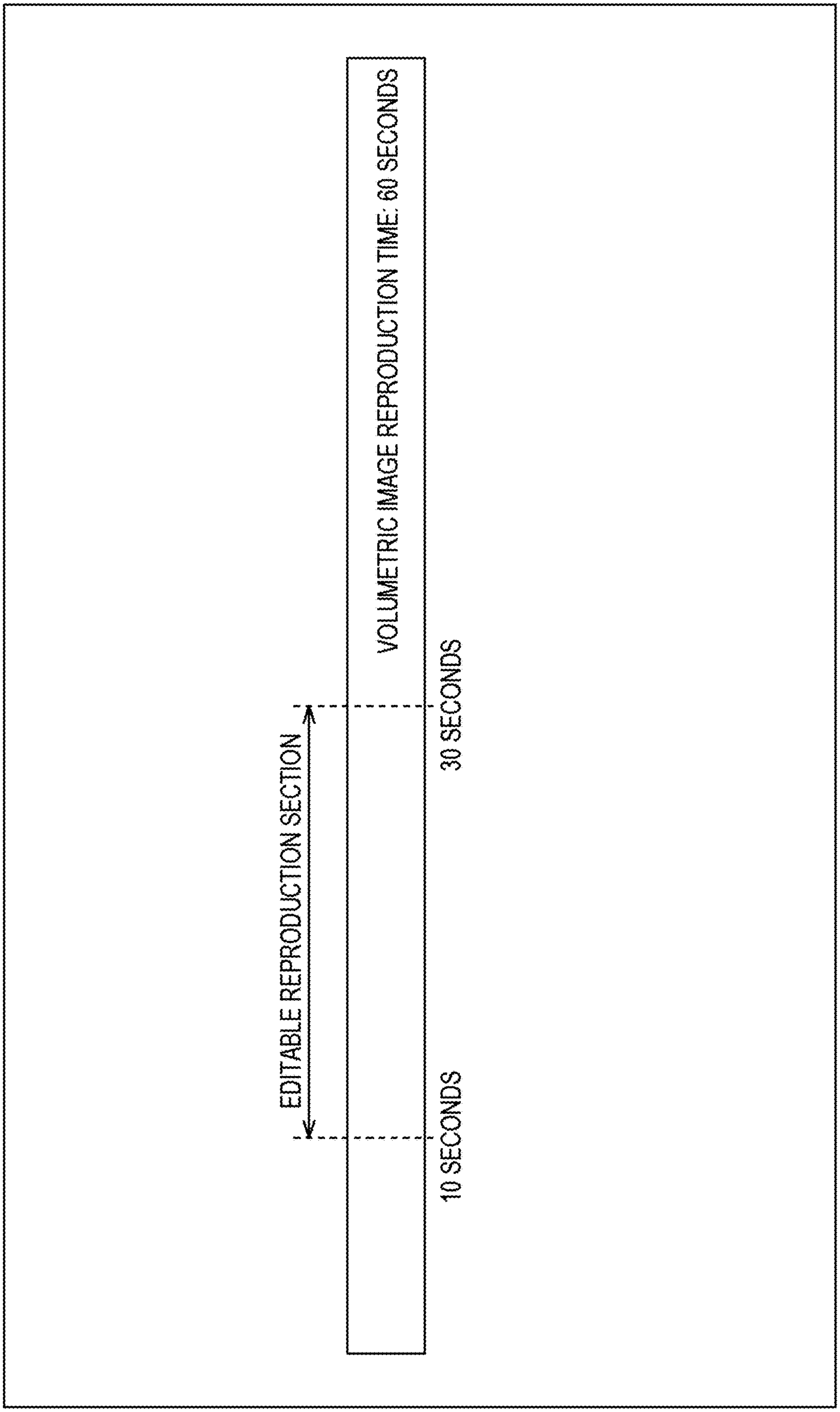
FIG. 17 is a diagram illustrating an example of restriction of editing content.

There is a case where the provider of a volumetric image does not want the volumetric image to be added with the additional information and combined with the effect image. In this case, for example, as illustrated in FIG. 17, with respect to a volumetric image having the total reproduction time of 60 seconds, it may be restricted by the restriction information that only a duration of 20 seconds from 10 seconds to 30 seconds from the start of reproduction is set as an editable reproduction section.

Position (Region) to which Additional Information is Added

In a situation where more sound posting to the SNS is expected, there is a case where it is desired that a position (region) to which additional information such as a comment is added is limited. In this case, the designation of the position to which the additional information is added by the user in the editor may be restricted by the restriction information.

Content of Additional Information

There is a case where it is desired to restrict content unsuitable for sharing on the SNS as the content of the additional information (a text, a still image, a moving image, sound, etc.). In this case, the content (content of sentences, attachment of images, etc.) of the additional information added by the user in the editor may be restricted by the restriction information.

Effect Image

There is a case where it is desired to restrict the effect image to be combined with the volumetric image. In this case, the effect image to be combined by the user in the editor may be restricted by the restriction information.

<4. Configuration Example of Computer>

The series of processing described above can be performed by hardware, or can be performed by software. In a case where the series of processing is executed by software, a program included in the software is installed from a program recording medium to a computer incorporated in dedicated hardware, a general-purpose personal computer, and the like.

Figure 18:
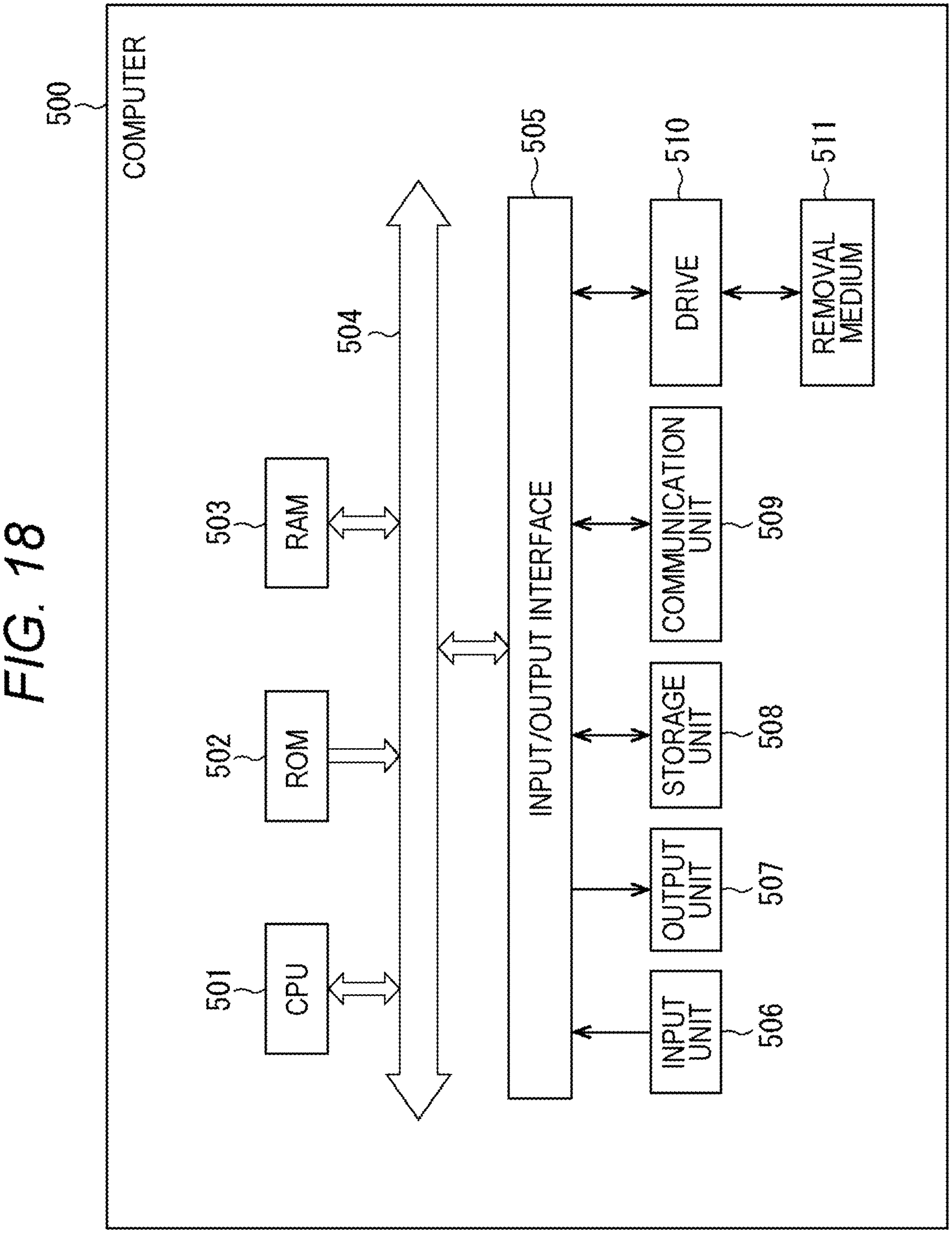
FIG. 18 is a block diagram illustrating a configuration example of hardware of a computer.

FIG. 18 is a block diagram illustrating a configuration example of hardware of a computer that executes the series of processing described above according to a program.

A user terminal 200 as a data processing apparatus to which the technology according to the present disclosure can be applied is realized by a computer 500 having a configuration illustrated in FIG. 18.

A CPU 501, a read only memory (ROM) 502, and a random access memory (RAM) 503 are mutually connected by a bus 504.

The bus 504 is further connected with an input/output interface 505. The input/output interface 505 is connected with an input unit 506 including a keyboard, a mouse, and the like, and an output unit 507 including a display, a speaker, and the like. Furthermore, the input/output interface 505 is connected with a storage unit 508 including a hard disk, a nonvolatile memory, and the like, a communication unit 509 including a network interface and the like, and a drive 510 that drives a removable medium 511.

In the computer configured as described above, for example, the CPU 501 loads a program stored in the storage unit 508 into the RAM 503 via the input/output interface 505 and the bus 504 and executes the program to perform the above-described series of processing.

For example, the program to be executed by the CPU 501 is recorded in the removable medium 511, or provided via a wired or wireless transmission medium such as a local area network, the Internet, or digital broadcasting, and then installed in the storage unit 508.

Note that the program to be executed by the computer may be a program in which processing is performed in time series in the order described herein, or may be a program in which processing is performed in parallel or at necessary timing such as when a call is made, and the like.

Embodiments of the present disclosure are not limited to the above-described embodiment, and various modifications can be made in a range without departing from the gist of the present disclosure.

Furthermore, the effects described herein are merely examples and are not limited to specific effects, and some other effects may be provided.

Moreover, the present disclosure may have the following configurations.

(1)

A data processing apparatus including:

an editing acceptance unit that accepts editing of a volumetric image in response to an operation of a user; and a data generation unit that generates converted data in which the volumetric image that has been edited is converted into a format that can be output by another device.

(2)

The data processing apparatus according to (1), in which the format includes a moving image, a still image, and a uniquely defined file format.

(3)

The data processing apparatus according to (2), in which the format includes a file format that can be posted on a predetermined social networking service (SNS).

(4)

The data processing apparatus according to (3), further including a data transmission unit that transmits the converted data to an SNS server.

(5)

The data processing apparatus according to any one of (1) to (4), in which the editing acceptance unit and the data generation unit constitute an editor configured to edit the volumetric image, and the editor operates in response to an operation on content browsed by the user.

(6)

The data processing apparatus according to (5), in which the editor includes a native application and is activated on the basis of designation information embedded in the content.

(7)

The data processing apparatus according to (5), in which the editor includes a web application and operates in a state of being embedded in the content.

(8)

The data processing apparatus according to (5), in which the content includes a website that can be browsed by a dedicated application or a web browser.

(9)

The data processing apparatus according to any one of (1) to (8), in which the editing acceptance unit generates editing information indicating editing content reflected in the volumetric image.

(10)

The data processing apparatus according to (9), in which the editing information includes viewpoint information that designates one or more viewpoint positions in the volumetric image.

(11)

The data processing apparatus according to (9), in which the editing information includes reproduction information designating at least one of a reproduction section and a reproduction speed in the volumetric image.

(12)

The data processing apparatus according to (9), in which the editing information includes additional information added to an object in the volumetric image.

(13)

The data processing apparatus according to (12), in which the additional information is added to a region designated in the object at a time designated in the volumetric image.

(14)

The data processing apparatus according to (12), in which the additional information is added on the basis of meta information included in the volumetric image and indicating a region to which the additional information can be added in the object.

(15)

The data processing apparatus according to (12), in which the object is a moving object or a still object.

(16)

The data processing apparatus according to (12), in which the additional information includes at least one of a text, a still image, a moving image, and voice.

(17)

The data processing apparatus according to (9), in which the editing information includes an effect image to be combined with the volumetric image.

(18)

The data processing apparatus according to (9), in which the volumetric image includes restriction information that restricts a range of editing content indicated by the editing information, and the editing acceptance unit generates the editing information in a range of editing content restricted on the basis of the restriction information.

(19)

A data processing method performed by a data processing apparatus, the method including:

accepting editing of a volumetric image in response to an operation of a user; and generating converted data in which the volumetric image that has been edited is converted into a format that can be output by another device.

(20)

A program that causes a computer to execute processing of:

accepting editing of a volumetric image in response to an operation of a user; and generating converted data in which the volumetric image that has been edited is converted into a format that can be output by another device.

REFERENCE SIGNS LIST

10 Data processing system
100 Content server
110 Content management unit
120 Content distribution unit
200 User terminal
210 Content reception unit
220 Rendering unit
230 Editing acceptance unit
240 Data generation unit
250 Data transmission unit
260 Accumulation control unit
300 SNS server
310 Data reception unit
320 SNS processing unit

The invention claimed is:

1. A data processing apparatus, comprising:

a rendering unit configured to render a volumetric image;

an editing acceptance unit configured to:

accept edit for the rendered volumetric image based on a first operation of a user; and edit the rendered volumetric image to indicate editing content in the volumetric image;

a data generation unit configured to:

convert the edited volumetric image to a format that is compatible for output by a user terminal, wherein the user terminal is different from the data processing apparatus, and the format includes:
a first moving image,
a first still image,
a uniquely defined file format, and
a file format compatible for a post on a social networking service (SNS); and
generate converted data based on the converted format of the edited volumetric image; and
a data transmission unit configured to output the generated converted data from the data processing apparatus to the user terminal.

2. The data processing apparatus according to claim 1, wherein the data transmission unit is further configured to transmit the generated converted data to an SNS server.

3. The data processing apparatus according to claim 1, wherein
the editing acceptance unit and the data generation unit constitute an editor, and
the editor is configured to edit the volumetric image, based on a second operation of the user on content browsed by the user.

4. The data processing apparatus according to claim 3, wherein
the editor includes a native application, and
the editor is further configured to be activated based on designation information embedded in the content.

5. The data processing apparatus according to claim 3, wherein
the editor includes a web application, and
the editor is further configured to operate in a state where the editor is embedded in the content.

6. The data processing apparatus according to claim 3, wherein
the content includes a website, and
the website is browsed based on one of a dedicated application or a web browser.

7. The data processing apparatus according to claim 1, wherein
the editing acceptance unit is further configured to generate editing information indicating the editing content, and
the editing content is indicated in the volumetric image.

8. The data processing apparatus according to claim 7, wherein the editing information includes viewpoint information that designates one or more viewpoint positions in the volumetric image.

9. The data processing apparatus according to claim 7, wherein the editing information includes reproduction information that designates at least one of a reproduction section or a reproduction speed in the volumetric image.

10. The data processing apparatus according to claim 7, wherein the editing information includes additional information for addition to an object in the volumetric image.

11. The data processing apparatus according to claim 10, wherein
the editing acceptance unit is further configured to add the additional information to a region designated in the object in the volumetric image, wherein
the additional information is added at a time designated in the volumetric image.

12. The data processing apparatus according to claim 10, wherein
the editing acceptance unit is further configured to add the additional information based on meta information of the volumetric image, and
the meta information indicates a region for addition of the additional information in the object.

13. The data processing apparatus according to claim 10, wherein the object is one of a moving object or a still object.

14. The data processing apparatus according to claim 10, wherein the additional information includes at least one of a text, a second still image, a second moving image, or voice.

15. The data processing apparatus according to claim 7, wherein the editing information includes an effect image that is combinable with the volumetric image.

16. The data processing apparatus according to claim 7, wherein
the volumetric image includes restriction information that restricts a range of the editing content indicated by the editing information, and
the editing acceptance unit is further configured to generate the editing information in the range of the editing content.

17. A data processing method, comprising:
in a data processing apparatus:
rendering a volumetric image;
accepting editing of the rendered volumetric image based on an operation of a user;
editing the rendered volumetric image to indicate editing content in the volumetric image;
converting the edited volumetric image to a format that is compatible for output by a user terminal, wherein
the user terminal is different from the data processing apparatus, and
the format includes:
a moving image,
a still image,
a uniquely defined file format, and
a file format compatible for a post on a social networking service (SNS);
generating converted data based on the converted format of the edited volumetric image; and
outputting the generated converted data from the data processing apparatus to the user terminal.

18. A non-transitory computer readable medium having stored thereon computer-executable instructions that, when executed by a computer, cause the computer to execute operations, the operations comprising:
rendering a volumetric image;
accepting editing of the rendered volumetric image based on an operation of a user;
editing the rendered volumetric image to indicate reflect editing content in the volumetric image;
converting the edited volumetric image to a format that is compatible for output by a user terminal, wherein
the user terminal is different from a data processing apparatus, and the format includes:
a moving image,
a still image,
a uniquely defined file format, and
a file format compatible for a post on a social networking service (SNS);
generating converted data based on the converted format of the edited volumetric image; and
outputting the generated converted data from the data processing apparatus to the user terminal.

* * * * *